Aug. 8, 1950 M. M. LEVY 2,517,579

MULTICHANNEL PULSE RECEIVING SYSTEM

Filed Aug. 2, 1946 2 Sheets-Sheet 1

INVENTOR
MAURICE M. LEVY
BY R. F. Morris
ATTORNEY

INVENTOR
MAURICE M. LEVY
BY R. P. Morris
ATTORNEY

Patented Aug. 8, 1950 2,517,579

UNITED STATES PATENT OFFICE 2,517,579

MULTICHANNEL PULSE RECEIVING SYSTEM

Maurice Moïse Levy, London, England, assignor to International Standard Electric Corporation, New York, N. Y., a corporation of Delaware Application August 2, 1946, Serial No. 688,161
In Great Britain December 28, 1945

2 Claims. (Cl. 179—15)

Figure 1:
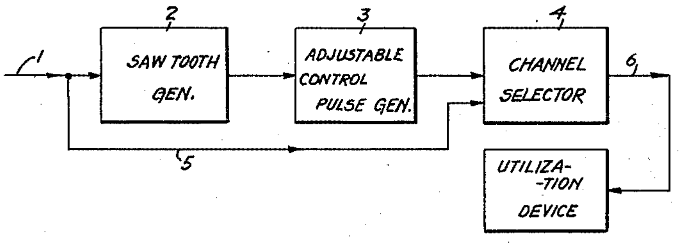

The present invention relates to receiving arrangements for multi-channel electric pulse communication systems, and is concerned with the means for selecting the pulses corresponding to any given channel from the combined pulse train as received, in which all the individual channel pulse trains are mixed.

The invention has two principal fields of application. The first of these is to radio broadcasting systems of the kind in which several programs are radiated from a given station by time-phase modulation of a number of corresponding trains of pulses which are mixed together to form a combined pulse train and are then employed to modulate a single carrier wave. The radio receivers for this system are adapted to receive and demodulate the carrier wave, and a given program is obtained by selecting the modulated train of pulses corresponding to that program and demodulating it in order to recover the modulating signals. This in effect involves the use of what is substantially a gating arrangement, the timing of which can be manually adjusted to pick out any one of the trains of pulses. Thus selection of the desired program is by timing instead of by tuning to a given wavelength.

Another application of the invention is to the selection of a particular channel in a multi-channel pulse communication system operating between two terminal points, for testing or monitoring purposes, for example. The arrangement should be such that by a convenient adjustment any channel can be picked out at will. It will be evident that the requirements are the same as for a broadcast receiver. The picking out of a single channel may also be required if it is desired to terminate a channel at some intermediate point, or to direct it to some other terminal point.

The present invention is concerned with the arrangements for selecting a given channel of such a multi-channel pulse system, and very good selectivity is obtained so that noise is reduced to a minimum and cross-talk from the channels due to interference between adjacent pulses is substantially eliminated.

It may be added that the arrangements according to the invention for selecting a single channel may be easily duplicated for the purpose of providing a complete gating arrangement for the receiving terminal of a multi-channel pulse system.

According to the present invention, there is provided a single channel receiver for a multi-channel time-phase modulation electric pulse communication system comprising pulse translating means normally unresponsive to channel pulses, means for generating a train of boundary pulses having the same periodicity as the pulses of each individual channel pulse train, means for applying the boundary pulses to the pulse translating means for the purpose of rendering it responsive only to those pulses which respectively follow next after the said boundary pulses, and means for adjusting the timing of the said boundary pulses to enable the pulse translating means to respond to the pulses of any specified channel.

The invention also provides a multi-channel electrical communication system comprising means for transmitting a plurality of time-phase modulated trains of channel pulses over a communication medium to a receiver, means in the receiver for generating a short boundary pulse at the beginning of each of the periods respectively allotted to the pulses of one specified train of channel pulses, pulse translating means adapted to be controlled by the boundary pulses in such manner that it responds only to the pulse which follows next after each boundary pulse, and means for applying all the trains of channel pulses to the said translating means.

According to another aspect there is provided a broadcast receiving arrangement for a system of the kind in which different programs are broadcast as respective time-phase modulations of a plurality of trains of electrical pulses which are combined together with a train of synchronising pulses, comprising means for applying the combined trains of pulses to demodulating means which is normally unresponsive, means controlled by the synchronising pulses for generating a train of boundary pulses of the same periodicity, means for applying the boundary pulses to the demodulating means in such manner as to render it responsive only to these pulses which respectively follow next after the boundary pulses, and means for adjusting the timing of the said boundary pulses with respect to the synchronising pulses.

Finally, the invention also provides a receiving arrangement for a multi-channel electric time-phase modulation pulse communication system comprising a plurality of normally unresponsive pulse translating means corresponding respectively to the channels of the system, a plurality of boundary pulse generators each adapted to control one of the said translating means, means for applying the incoming channel pulse trains to all the said translating means in parallel, and means controlled by the synchronising pulses and adapted to synchronise all the said boundary pulse generators in parallel for the purpose of synchronising the boundary pulses, the arrangement being such that each boundary pulse generator generates a pulse at the beginning of the period allotted to each pulse of the corresponding channel pulse train, and such that each boundary pulse renders the corresponding translating means responsive only to the channel pulse which follows next after the said boundary pulse.

Figure 2:
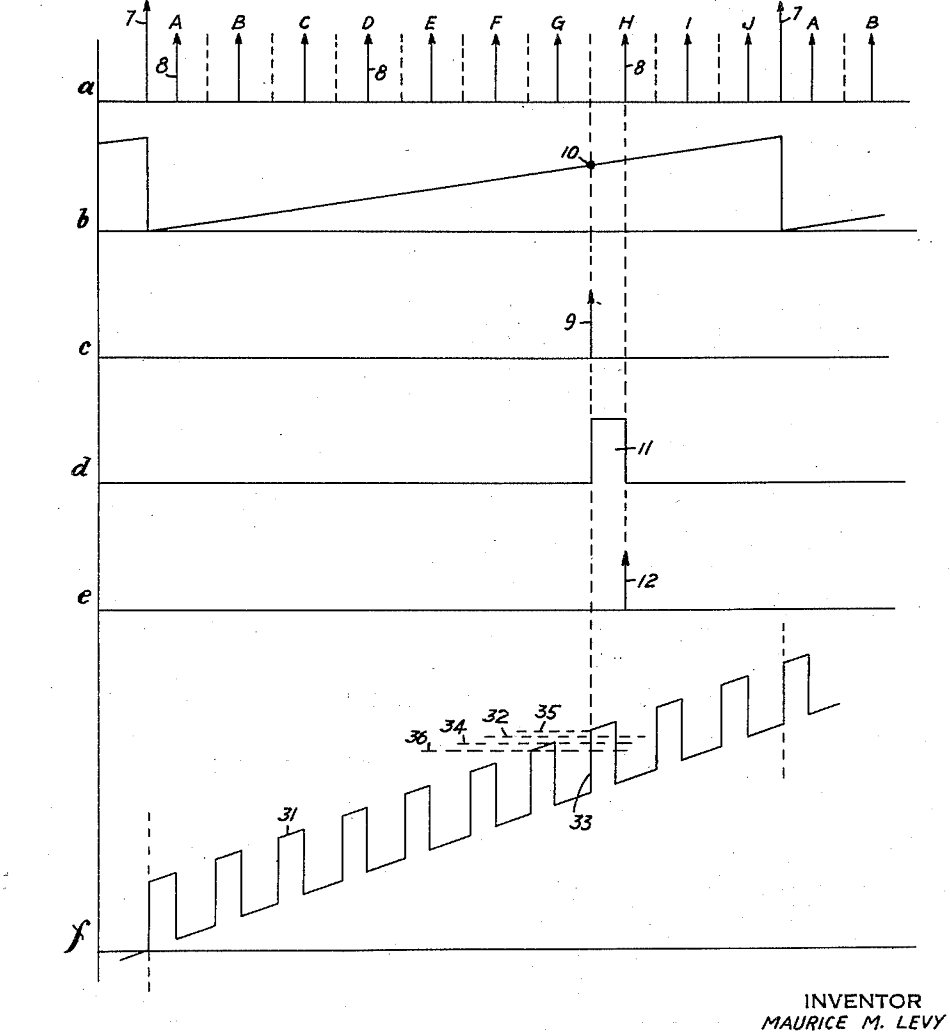
Figure 3:
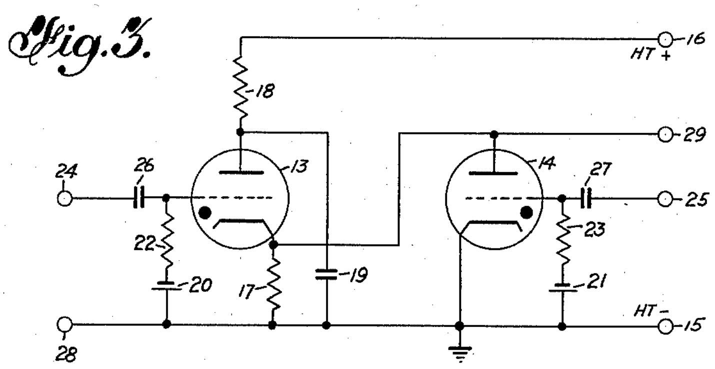
Figure 4:
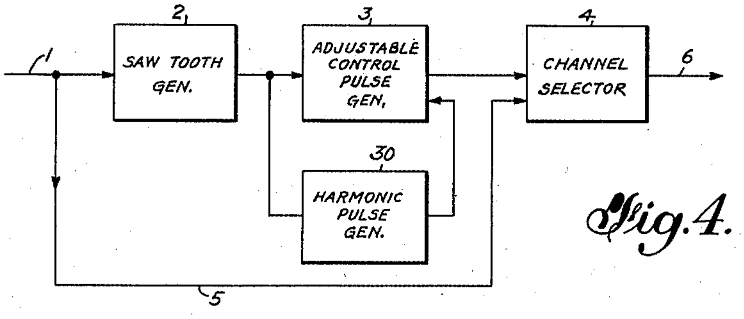
Figure 5:
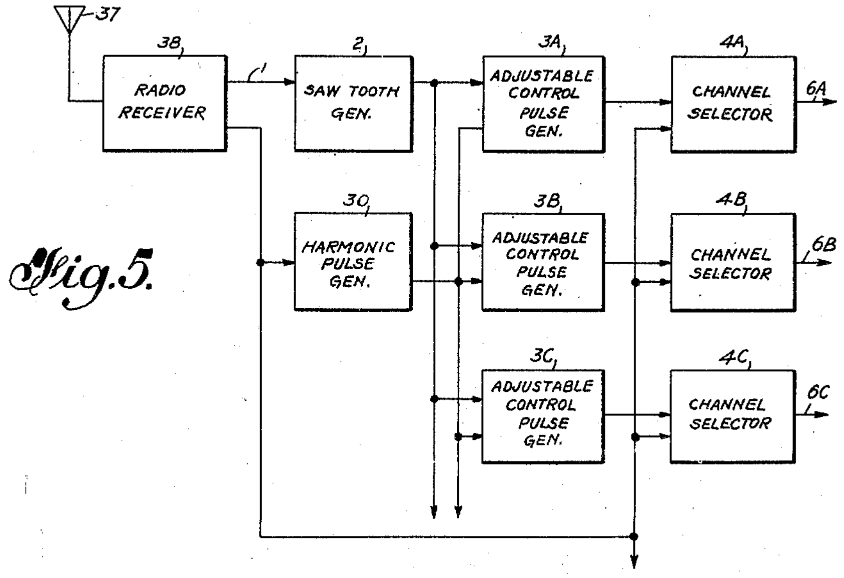

Embodiments of the invention will be described with reference to the accompanying drawings, in which:

Fig. 1 shows a block schematic circuit diagram of one embodiment of the invention;

Fig. 2 gives diagrams employed in explaining the action of the embodiments of the invention;

Fig. 3 gives a schematic circuit diagram of one form of multivibrator which may be used in Fig. 1;

Fig. 4 shows a block schematic circuit diagram of an improved embodiment of the invention; and Fig. 5 shows a block schematic circuit diagram of still another embodiment of the invention.

Fig. 1 shows a block schematic diagram of the simplest form of the invention. A train of mixed channel pulses and synchronising pulses obtained after demodulation from the carrier wave (if any) is applied over the conductor 1 to a saw-tooth wave generator 2 of conventional type which is adapted to be synchronised in well known manner by the synchronising pulses. The saw-tooth waves from 2 are applied to a boundary pulse generator 3 also of conventional type, adapted to emit a short pulse at some predetermined point during the scanning stroke of each saw-tooth wave. The generator 3 is so biassed or adjusted that the short pulse occurs at the beginning of each period allotted to the particular channel pulse which it is desired to isolate. The short boundary pulses are applied from the generator 3 to a channel selecting device 4 to which also are applied the original mixed train of pulses over the conductor 5. The device 4 is of a kind which is normally unresponsive to any of the pulses applied over the conductor 5, except when it has been conditioned or sensitised by a boundary pulse, and it then responds to the next following channel pulse, and in responding becomes insensitive again until the next boundary pulse arrives. The device 4 may be designed to produce at its output 6 a train of rectangular pulses of which the leading edges coincide with the boundary pulses, and the trailing edges with the next following channel pulses. If such channel pulses are time-phase modulated, the output rectangular pulses will be time-duration modulated and may be immediately demodulated if desired in known manner by the use of a low pass filter, for example.

The action of the arrangement of Fig. 1 will be more clearly understood from the diagram shown in Fig. 2. A ten channel system will be assumed, the channels being designated by the letters A to J, but it will be understood that the same principles apply to a system having any number of channels. Row *a* shows the period between two synchronising pulses 7, with the respective channel pulses shown at 8. Each channel pulse may be anywhere in a channel period equal to about one tenth of the period between the two synchronising pulses, and will move in the channel period in accordance with the time-phase moduation of the corresponding channel train. The height of the synchronising pulses is shown greater than that of the channel pulses to indicate one means by which they may be distinguished. The boundaries of the successive channel periods are indicated by the vertical dotted lines.

Suppose it is desired to select the pulses of channel H. The saw-tooth generator 2 (Fig. 1) generates the wave shown in row *b*, Fig. 2, with the fly-back strokes coinciding with the synchronising pulses 7. The generator 3 is adjusted to emit a boundary pulse 9 shown in row *c* at the time corresponding to the point 10 (now *b*) where the scanning stroke of the saw-tooth wave cuts the boundary line between the channel periods G and H. This boundary pulse sensitises the device 4 so that when the channel pulse 8 corresponding to channel H appears, the device 4 responds and then ceases to be affected by any of the following channel pulses until after the boundary pulse in the next synchronised period. The effect of the pulse 9 followed by the pulse 8 of channel H is to cause it to generate a rectangular pulse 11 shown in row *d* of Fig. 2, of which the leading edge corresponds with the pulse 9 and is invariable, and the trailing edge with the channel pulse, and moves therewith. The pulses 11 are accordingly time-duration modulated.

If it is not desired to demodulate the pulses of channel H, a short pulse 12 in row *e* may be obtained from the trailing edge of the rectangular pulse 11 by differentiation, and the train of pulses so obtained may be directed elsewhere. In this way, for example, the pulses of channel H may be separated from the other channels of the system at an intermediate point and sent to a different destination without demodulation.

By providing the generator 3 with a variable bias adjustment, the boundary pulse 9 may be shifted to any point in the main synchronised period, and this will enable the pulses of any channel to be picked out at will, as in a broadcast receiver, or for monitoring and testing purposes, for example.

It will be understood that the diagram of Fig. 2 does not signify any particular sense or polarity for the pulses or waves, but only indicates the times corresponding to the pulses or waves.

The generator 3 may for example be one of the well known two-conditioned devices or multivibrators having one stable and one unstable condition, which can be switched over suddenly to the unstable condition when the bias of some electrode reaches a critical value. One suitable form for the channel selector device 4 is shown in Fig. 3. The circuit comprises two grid-controlled gas-filled valves 13 and 14, the anode potential source for which is intended to be connected to terminals 15 and 16, the negative terminal 15 being preferably connected to ground. The cathode of the valve 13 is connected to terminal 15 through a resistance 17, and the anode is connected to the terminal 16 through a resistance 18, and to ground through a condenser 19. The cathode of the valve 14 is directly connected to ground, and its anode is connected to the cathode of the valve 13. The control grids of the valves are appropriately biassed from sources 20 and 21 through high resistances 22 and 23. Corresponding input terminals 24 and 25 are connected respectively to the control grids through blocking condensers 26 and 27. A ground terminal 28 corresponding to terminal 24 is shown, and also an output terminal 29 connected to the cathode of the valve 13.

In the normal condition of the circuit, the valve 13 is biassed so as to be non-conducting, and condenser 19 is thus charged to the potential of the high tension source. There being no current in the resistancce 17, there will be no potential applied to the anode of the valve 14, so this valve will be non-conducting also.

The boundary pulses derived from the generator 3 are intended to be applied between terminals 24 and 28, in positive sense to the control grid of the valve 13, so that the valve is fired by the first boundary pulse which arrives. A current being established therein, the condenser partially discharges to a potential determined principally by the values of the resistances 17 and 18, and this potential should be sufficient to maintain the valve 13 in the ionised condition. The current in the resistance 17 then applies a positive potential to the anode of the valve 14, but this potential should be insufficient to fire the valve. The train of mixed synchronising and channel pulses should be applied between the terminals 15 and 25, in positive sense to the control grid of the valve 14, so that the next channel pulse which follows the boundary pulse is able to fire the valve 14 which has just been energised. When the valve 14 is fired, the resistance 17 is substantially short-circuited and the condenser 19 discharges almost instantaneously through the two valves, thus reducing practically to zero the potential of the anode of the valve 13, which is then extinguished. The potential across the resistance 17 drops to zero and extinguishes the valve 14. Then the condenser 19 charges up again to the high tension voltage without firing the valve 13, and the circuit remains insensitive until the next boundary pulse arrives.

It will be evident that a positive rectangular pulse similar to 11 (Fig. 2, *d*) will be obtained at the output terminal 29, the leading edge of which is produced by the firing of the valve 13, and the trailing edge by the firing of the valve 14, which also extinguishes the valve 13.

In the simple arrangement which has been described with reference to Fig. 1, the boundary pulse generator is liable to be slightly variable in performance, so that the timing of the boundary pulses may be slightly variable. This would be of no importance if the arrangement were employed, for example, to pick out a channel by manual adjustment of the bias of the generator 3 for monitoring purposes. In other cases, such as in a broadcast receiver, however, it may be necessary that the boundary pulses be accurately timed without the necessity for a critical or constant adjustment of the generator 3. In this case the arrangement of Fig. 1 may be modified in the manner shown in Fig. 4. The modification consists in the addition of a harmonic pulse generator 30 which is adapted to derive a train of pulses from the synchronising pulses of the mixed pulse train, the repetition frequency of which is $n$ times that of the synchronising pulses, where $n$ is the number of channels of the system. These harmonic pulses may be generated by applying the synchronising pulses to a band pass filter adapted to select the $n$th harmonic component, from which short substantially rectangular pulses with steep leading edges may be derived in well known manner by amplification and amplitude limitation. These rectangular pulses may be superposed on the saw-tooth waves from the generator 2 so as to produce the wave 31 shown at *f*, Fig. 2. It will be assumed that the generator 3 is adapted to emit a boundary pulse when the potential of an electrode of a valve in the generator reaches a critical value indicated by the dotted line 32 of Fig. 2, *f*. It will be seen that the seventh leading edge 33 after the synchronising pulse 7 crosses the line 32, so that a boundary pulse 9 for channel H will be emitted at this time. It will be clear that the timing of the boundary pulses is determined substantially by the harmonic pulses and will not be affected by small variations in the position of the line 32, or in the slope of the scanning stroke of the saw-tooth wave. By providing a bias adjustment for the generator 3, the line 32 may effectively be raised or lowered by any desired amount, so that the boundary pulse 9 will be emitted at the time corresponding to any other leading edge.

It will be clear from *f*, Fig. 2, that the permissible variations of slope of the scanning stroke of the saw-tooth wave or of the level of the line 51 will be limited so that the line 32 lies effectively between the dotted lines 34 and 35, otherwise the pulse 9 will be emitted at the wrong time. If, however, the rectangular pulses are differentiated before superposing on the saw-tooth waves, short pulses coinciding with the leading edges may be obtained and may be added to the saw-tooth waves, in which case the allowable limits of variation for the line 32 will be increased, the limits now being represented by the dotted lines 35 and 36. For this mode of operation a differentiator may be included as part of harmonic pulse generator 30.

It may be pointed out that the arrangement of Fig. 4 is particularly suitable for the automatic selection of a desired program in a radio broadcasting receiver. All that is necessary is to provide a number of simple switches or "push buttons" each of which applies a different fixed bias to the generator 3, producing a corresponding effective level for the dotted line 32, which determines at which leading edge the boundary pulse 9 is to be emitted. It will be obvious that the arrangement can be very simple indeed, and the bias does not need to be set with great accuracy for the reasons already explained. In the conventional receivers which have to be accurately tuned to the wavelength corresponding to the desired program, the push buttons, if used, each have to control an accurately adjusted tuned circuit, and the arrangement is extremely complicated.

Fig. 5 shows an example of how the arrangements which have been described may be duplicated in order to select all the channels of a multi-channel system for separate demodulation by known methods. Modulated waves are received on the antenna 37 connected to a radio receiver 38 of conventional type which is adapted to demodulate the waves to produce the time-phase modulated trains of channel pulses mixed together with the synchronising pulses. These are applied over conductor 1 to the saw-tooth generator 2, the output of which is connected in parallel to the pairs of channel elements 3A, 4A, 3B, 4B etc. one pair for each channel, the elements in each group being similar to elements 3 and 4 of Fig. 1 or 4. A single harmonic pulse generator 30 is connected in the manner indicated in Fig. 4 and in parallel to each of the elements 3A, 3B etc.

Each of the pairs of elements acts with the harmonic pulse generator 30 exactly in the manner described with respect to Fig. 4, and the only difference between the various pairs is that the bias level 32 (Fig. 2, *f*) for each of the boundary pulse generators 3A, 3B etc. is set at a different value, so that the line 32 meets the leading edge of the particular harmonic pulse (or the short differentiated pulse coinciding therewith if this be employed) which marks the beginning of the corresponding channel pulse period. It will be appreciated that the channel selectors 4A, 4B etc. will be rendered responsive in successive pulse periods and each will therefore generate a single train of time duration modulated pulses corresponding to a different one of the channels. These trains of pulses may be separately demodulated by the usual means (not shown).

The harmonic pulse generator 30 could if desired be omitted, and the various channel groups would then function in turn in the manner described with reference to Fig. 1, but as already explained the functioning of the circuit would be much more susceptible to variations in the operating conditions. The use of the harmonic pulse generator 30 is therefore to be preferred.

It is to be noted that since all pairs of channel elements are operated in parallel, the failure of one of them to function correctly will not affect the functioning of any of the others. This is a well known defect of tandem-connected gating arrangements which frequently calls for special means to prevent the failure of one channel from upsetting all the others.

Various minor modifications of the arrangements which have been described will occur to those skilled in the art. For example, the sawtooth waves generated by the element 2 could be inverted and the pulse generator 3 could be designed to operate with a rising bias voltage instead of with a falling bias voltage. In that case the harmonic pulses would be superposed in the opposite sense.

What is claimed is:

1. In a receiver for a multi-channel time phase modulation electric pulse communication system wherein the multi-channel train includes synchronizing pulses having a regular repetition rate, means for generating a train of regularly repeated control pulses having the same repetition rate as the pulses of each individual channel pulse train in their unmodulated state, and each control pulse being timed to immediately precede a pulse of the channel train to be selected, said generating means including a sawtooth generator to which said synchronizing pulses are applied to produce sawtooth waves, and adjustable means responsive to a selected amplitude of each of said sawtooth waves for producing one of said control pulses, and means responsive to each of said control pulses and its corresponding pulse of said selected channel for producing an output pulse whose leading edge corresponds to said control pulse and whose trailing edge corresponds to said channel pulse comprising a two stable level trigger device, connections for applying the control pulses to trip said device from its first level to its second level, and connections for applying the multi channel train pulses to retrip said device back to its first level.

2. A receiver according to claim 1, further including means controlled by said synchronizing pulses for producing pulses having a repetition rate which is a harmonic of the synchronizing pulse repetition rate, means for mixing the harmonic pulses with the saw-tooth wave to thereby produce a complex wave form, and means for applying the complex wave to the adjustable means for producing control pulses.

MAURICE MOÏSE LEVY.

REFERENCES CITED

The following references are of record in the file of this patent:

UNITED STATES PATENTS

| Number | Name | Date |
|---|---|---|
| 2,048,081 | Riggs | July 21, 1936 |
| 2,199,634 | Koch | May 7, 1940 |
| 2,213,941 | Peterson | Sept. 3, 1940 |
| 2,262,838 | Deloraine et al. | Nov. 18, 1941 |
| 2,282,046 | Goldsmith | May 5, 1942 |
| 2,380,520 | Hassler | July 31, 1945 |
| 2,395,467 | Deloraine | Feb. 26, 1946 |
| 2,403,210 | Butement | July 2, 1946 |
| 2,423,466 | Peterson | July 8, 1947 |